United States Patent
Sklyarevich et al.

(10) Patent No.: US 7,063,760 B2
(45) Date of Patent: Jun. 20, 2006

(54) METHOD FOR LAMINATING GLASS SHEETS USING MICROWAVE RADIATION

(75) Inventors: Vladislav Sklyarevich, Bensalem, PA (US); Mykhaylo Shevelev, Feasterville, PA (US)

(73) Assignee: Gyrotron Technology, Inc., Bristol, PA (US)

( * ) Notice: Subject to any disclaimer, the term of this patent is extended or adjusted under 35 U.S.C. 154(b) by 323 days.

(21) Appl. No.: 10/802,626

(22) Filed: Mar. 17, 2004

(65) Prior Publication Data

US 2005/0150586 A1    Jul. 14, 2005

Related U.S. Application Data

(60) Provisional application No. 60/536,338, filed on Jan. 13, 2004.

(51) Int. Cl.
 *B32B 37/06*    (2006.01)
(52) U.S. Cl. ............ 156/106; 156/103; 156/104; 156/273.3; 156/273.5; 156/275.5; 156/275.7; 156/286
(58) Field of Classification Search ............ None
See application file for complete search history.

(56) References Cited

U.S. PATENT DOCUMENTS

| | | | |
|---|---|---|---|
| 3,509,015 A | 4/1970 | Wismer et al. | |
| 4,125,669 A | 11/1978 | Triebel et al. | |
| 4,234,533 A | 11/1980 | Langlands | |
| 4,724,023 A | 2/1988 | Marriott | |
| 4,828,598 A | 5/1989 | Imamura et al. | |
| 5,118,371 A | 6/1992 | Hori et al. | |
| 5,268,049 A | 12/1993 | Marriott et al. | |

FOREIGN PATENT DOCUMENTS

| | | | |
|---|---|---|---|
| WO | WO 88/03517 | * | 5/1988 |
| WO | WO 98/40324 | * | 9/1998 |

* cited by examiner

*Primary Examiner*—Jessica Rossi
(74) *Attorney, Agent, or Firm*—Carothers and Carothers

(57) ABSTRACT

A method for laminating glass sheets wherein laminating film is placed over one surface of a first glass sheet and the film is heated with microwave radiation to a bonding temperature. Heated areas of the film are successively pressed to the glass sheet in a continuous manner for purging air from between the film and the first glass sheet and for applying bonding pressure. The pressed film areas are then cooled whereby an appropriate bond is attained between the film and the first glass sheet. Thereafter the first glass sheet with its bonded film is subjected to a partial vacuum and a second glass sheet is positioned on the film and the second glass sheet is pressed to the film. The film is then reheated with microwave radiation to a bonding temperature and thereafter cooled whereby an appropriate bond is obtained between the film and the second glass sheet to provide a glass lamination.

21 Claims, 3 Drawing Sheets

METHOD FOR LAMINATING GLASS SHEETS USING MICROWAVE RADIATION

CROSS REFERENCE

This application is based upon Provisional Application No. 60/536,338, filed on Jan. 13, 2004.

BACKGROUND OF THE INVENTION

1. Field of the Invention

The present invention relates to a method for laminating glass sheets and other frangible materials, wherein a plastic film is sandwiched between sheets.

Flat or non-flat sheets of glass, ceramics, polymers, or combinations of these materials may be laminated in accordance with the teachings of the present invention.

2. Discussion of the Prior Art

Laminates provide a way of strengthening frangible material, for example glass, so as to extend its uses and to render it safer to use in certain circumstances. Thus laminated glass products can be used for automotive and aircraft glazing, glass doors, balustrades, bulletproofing and many other uses where the glass product must be strong and/or shatterproof.

In conventional laminated glass products a sheet of glass is bonded to a layer of polymer adhesive film, and a further sheet or layer of material is bonded to the other side of the adhesive film layer, so that the adhesive film is sandwiched between two outer layers. If the glass sheet is then struck a blow it cracks or breaks, but does not shatter into small hazardous sharp pieces as the broken pieces are still bonded to and held in place by the polymer layer. If the laminated glass is used in a car windscreen, therefore, occupants of the car are not showered with broken glass upon breakage of the windscreen.

A number of methods for producing such laminates have been disclosed. For Example, see U.S. Pat. Nos: 5,268,049; 5,118,371; 4,724,023; 4,234,533; and 4,125,669. Laminated glass has been generally manufactured by a process wherein a stack of at least two sheets of glass having a plastic film called an intermediate film or laminating film, typically a plasticized polyvinyl butylal (PVB) film, is sandwiched between each pair of adjacent sheets of glass which is subjected to evacuation, pressing and heating.

Usually this involves long heating under temperatures of around 80° C.–140° C. and high pressure, 4 MPa–20 MPa. The main problem encounter is that air is trapped between the film and glass surfaces, which air must be removed. This is required to prevent the laminate from bubbling. Removing the remainder of the air requires long heating and high pressure. The bubbling is a visible and objectionable defect that in most cases is absolutely unacceptable. Besides, bubbling within the laminate may reduce its strength in this area and cause delamination.

At the same time removing air is not an easy task because it is trapped between both sides of the plastic film and glass sheet and there are only two mechanisms by which the air can escape: diffusion and dissolving in the film. Both processes are very slow, requiring long term heating and applying of high pressure. The bigger the glass sheet, the longer the time required. An especially long time is required for making multi-layer laminates. As a result, the productivity of such processes is low and they require considerable capital expenditure to set up the necessary costly apparatus such as autoclaves.

Many prior art patents focus on the solution of problems related to the air escaping. In U.S. Pat. No. 5,268,049, glass sheets are spaced apart, and in the method described by U.S. Pat. No. 5,268,049, a liquid resin is used. In U.S. Pat. No. 4,234,533 the two sheets are held at an angle and in U.S. Pat. No. 5,118,371 the thickness of PVB gradually increases (or decreases) from the one side to the other side of the glass sheets. In U.S. Pat. No. 3,509,015 a method is described for producing laminated glass by sealing the periphery of two parallel glass sheets with pressure sensitive tape and forcing resinous material under pressure into the inter-sheet space. The resinous material is forced through a self-closing valve held in place with the tape while trapped air escapes through an aperture in the taped seam at the top of the cell. U.S. Pat. No. 4,125,669 describes a similar method in which two glass panes are sealed all around except for a filling opening and an aeration opening, and a binder material is introduced into the envelope thus formed in an amount calculated to exactly fill the envelope. Putty is applied to the openings just before emergence of the binder upon laying the filled envelope flat.

U.S. Pat. No. 3,315,035 describes a method involving the maintaining of the glass sheets in opposite relationship, heating the sheets to about 200° F. and injecting a resin composition containing a hardening agent, preheated to about 200° F., into the inter-sheet space and curing the assembled article. In U.S. Pat. No. 4,234,533 the seal around the sheets is formed by a gas-permeable, resin-impermeable material such as "Scotchmount". In some inventions (see for example U.S. Pat. Nos. 4,828,598 and 4,724,023) the laminating process is conducted in a vacuum. The vacuum environment helps air to escape and, in general, can reduce the level of trapped air. However, heating in a vacuum is always difficult, inefficient and therefore the laminating process still requires a long time.

Thus, all the above described methods of air bubble removal, are not fully effective and still require long term heating (high energy consumption) and special expensive equipment, such as high pressure autoclaves.

At the same time, extremely large numbers of windshields, windows and other laminate products are made each year. Accordingly, there is a clear need in the art for a more effective and less expensive method for laminating glass sheets which eliminates expensive equipment and reduces energy consumption.

SUMMARY OF THE INVENTION

According to the present invention, a method is provided for laminating glass sheets and other frangible material with the thermal treatment of a laminating film that is processible by controlled heating which is fast and does not require the use of autoclave type furnaces. Products prepared using the method of the present invention include, but are not limited to, architectural glass, glass doors, balustrades, bulletproof glass, windshields, side windows and rear windows for vehicles such as automobiles and the like, as well as many other uses where the glass product must be strong and/or shatterproof and comparable products. The inventive method utilizes microwave radiation to rapidly apply heat to the adhesive film to be thermally treated.

In the method for laminating glass sheets in accordance with the teachings of the present invention, laminating film is placed over one surface of a first glass sheet and the film is heated in a continuous manner with microwave radiation to a bonding temperature. Thereafter areas of the heated film are successively pressed to the first glass sheet in a continuous manner for purging air from between the film and the glass sheet, and for applying bonding pressure. The pressed film areas are then cooled whereby an appropriate bond is attained between the film and the glass sheet.

The first glass sheet with the applied bonded film is then subjected to a partial vacuum and a second glass sheet is positioned on the film. During this process the second glass sheet is pressed to the film and the film is reheated with microwave radiation to a bonding temperature. Thereafter the reheated film is cooled whereby an appropriate bond is attained between the film and the second glass sheet thereby providing a glass sheet lamination.

The laminating process of the present invention may also be carried out with a stack of glass sheets. In this embodiment multiple of first glass sheets with applied bonded film are stacked in the partial vacuum whereby non-coated surfaces of the first glass sheets engage the film bonded to an adjacent first glass sheet, leaving one bonded film left exposed. The second glass sheet is positioned on the exposed film of the stack and the steps of reheating the film and cooling the reheated film are each carried out on all film layers in the stack simultaneously.

In the initial step of placing the laminating film over one surface of the first glass sheet, in accordance with the teachings of the present invention, an edge of the film may be fixed to a corresponding edge of the first glass sheet and then the step of heating is initiated at the fixed edge and continuously advance therefrom over the film. In carrying out this procedure, it is desired to have an initial gap between the film and the first sheet and the sheet is then successively and progressively pressed to purge the air with a non-stick applicator. The steps of heating and pressing the film to the first glass sheet may be provided successively in a continuous manner by moving a combination microwave heater-roller over the film.

The microwave radiation frequency is generally selected to be between approximately 0.9 GHz to approximately 200 GHz. The microwave radiation wavelength is preferably selected to be between approximately four optical thicknesses of the first glass sheet for the selected wavelength to approximately the sum of the thicknesses of skin layers in the film and the first glass sheet.

The initial heating of the film to the first glass sheet may also be carried out in a partial vacuum and the vacuum level in this stage or in the reheating stage is selected whereby remaining air in the laminate does not create visible defects. Additional electromagnetic heat may also be applied by an additional source with a wavelength that is significantly shorter than the applied microwave radiation used to reheat the film. To enhance the process of heating the film, a metal reflector may be positioned behind the first glass sheet.

The method of the present invention avoids the use of expensive and inefficient autoclave type furnaces and allows conducting the laminating process continuously with high production rate and low energy consumption.

The main advantages of this high speed method are reduction of manufacturing costs and increase of production rate. Other advantages exist, such as production yield and providing an opportunity for process automation.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

DETAILED DESCRIPTION OF THE PREFERRED EMBODIMENTS

Figure 1:
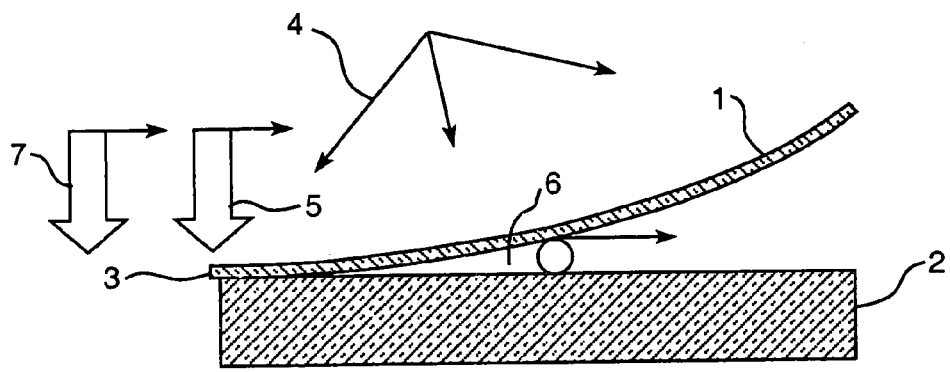
FIG. 1 is a schematic drawing illustrating heating of the film by microwave with progressive pressing and cooling in a continuous manner in accordance with the teachings of the present invention.

The present invention relates to a method of laminating frangible materials, preferably glass sheets, without using autoclave type furnaces to effect rapid and exclusive microwave heating of the film. In the invention the laminating film (1) (see FIG. 1) is placed over the first glass sheet (2) with a gap (6) and is fixed it to one edge (3) of the glass sheet. Selected areas of the film, which can be the entire film or a local portion of it, are exposed to microwave radiation (4) which heats it to a sufficient bonding temperature. The heated film areas are successively non-stick pressed to the first glass (2) by way of a moving pressing zone (5) in a continuous manner. Pressing begins from the area where the film is fixed to edge (3) in a direction toward the opposite edge. The ability to successively and continuously press the rapidly heated film area in combination with the ability to maintain a gap (6) between glass and film in front of the pressing zone significantly facilitates and accelerates the air removal process from gap (6). Cooling of the film (1) follows pressing and can be accomplished in many typical ways such as by cold air stream (7) behind the pressing tool, by the pressing tool itself or by a portion of it, etc. As a result an appropriate bond between the entire film and the surface of the first glass sheet can be obtained.

Speed and quality of bonding increases if heating and pressing are provided simultaneously. For this the microwave radiation (4) (FIG. 2) heats a local area of the film (1) through the pressing tool (9) that is made from materials that are transparent to the microwaves. Among such materials are Teflon, quartz, oxide ceramic, or the like. The easiest way of simultaneously heating and pressing is to provide a local heat area in the shape of a strip (8) (see FIG. 3) and pressing is provided by a tool (9) in the form of a roller made from Teflon, quartz, oxide ceramic, or the like.

Figure 4:
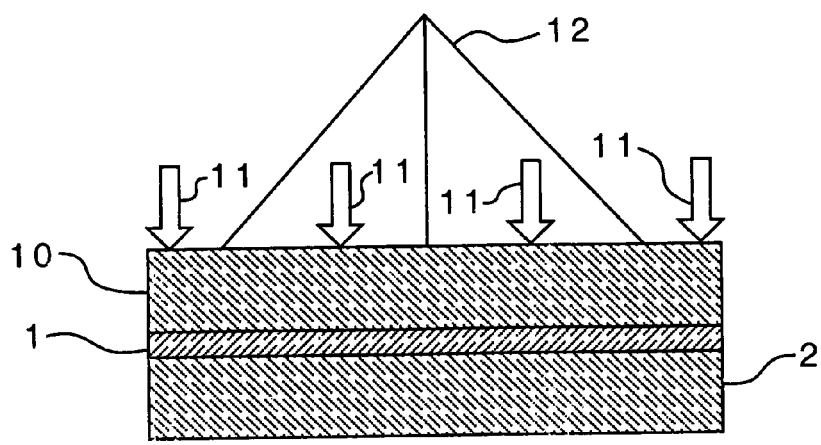
FIG. 4 is a schematic drawing illustrating the reheating and pressing of a stacked laminate in accordance with the teachings of the present invention.

When the film (1) (see FIG. 4) is bonded to the first glass sheet (2) it is placed in a partial vacuum, which is illustrated by the surrounding space of the drawing, and a second glass sheet (10) is placed above (on the top of) the film (1) and the second glass sheet (10) is pressed to the film (1) as indicated at (11) while the film (1) is reheated by microwave (12) to sufficient bonding temperature. Then recooling (which is not illustrated), is performed to create the laminate. The laminating process is rapid because the vacuum level is selected so that the remaining air does not create visible defects in laminate and there is no requirement for air removal. There is no need to apply high pressure and long heating for dissolving air, as in the current technologies. Practically, the vacuum level should be no greater than one kPa. This does not require expensive pumps and can be achieved in seconds even for large chambers of many cubic meters.

Speed of laminating increases if reheating and repressing are provided simultaneously. To accomplish this the microwave radiation heats the film through the pressing tool itself which is made from materials that are transparent to the microwaves. Among such materials are Teflon, quartz, oxide ceramic, or the like. The easiest way of simultaneously reheating and pressing the second glass sheet is to provide the local heating area in the shape of a strip.

In the embodiments of the invention discussed above, reheating time as well as cost can be reduced by at least 10% to 20% by using microwave radiation and an additional electromagnetic heat source, for example an infrared source.

In the embodiments of the invention discussed above, production rate increases and capital costs decrease by placing the first glass sheet with the film placed over it in a vacuum before heating. In this case the glass moves only once into position (to the vacuum chamber) where the heating and reheating processes are provided. The vacuum chamber is used as a microwave chamber.

In the method of the present invention, microwave radiation with appropriate frequency (wavelength) is used. In all of the embodiments of the present invention, the wavelength of the applied microwave radiation is an important parameter that must be determined for each type and thicknesses, both of the film and glass sheet being processed. The particular frequency chosen should ensure maximum selectivity of direct heating of the film through the thickness of the second glass sheet. In addition, the chosen frequency should be cost effective and microwave generators for the selected frequency should be readily available at the required power.

When microwave radiation is applied to a film placed over the glass or to the first and the second glass sheets with the film between, the microwave radiation passes through the film and glass sheets and heats all of them. The portion of the energy that is absorbed by the film and by the glass sheets depends on the microwave frequency, absorption properties of the film and glass sheets and their thicknesses. The film and glass absorption properties are usually close for microwave wavelengths larger than the skin layer in the film and glass for these wavelengths. In this case, the processed areas of the film and glass sheets are heated to approximately the same temperature and the heating time depends on power density. The more power density, the faster the film can be bonded to the first glass sheet. However the necessary power density drastically rises if the microwave frequency is lower than 0.9 GHz, and this creates many technical and economic problems.

Using microwave with shorter wavelengths (higher frequency) reduces heating and reheating time and increases efficiency of the processes. Total microwave energy is coupled inside the film and glass in this case. However microwave generators on a frequency higher than 200 GHz for the necessary power are not available.

Therefore, the microwave frequency range for the present invention is generally between about 0.9 GHz and about 200 GHz. Selecting a millimetric wavelength range for the microwave radiation allows generators that produce concentrated controllable power (such as gyrotrons) to be used. Using this wavelength range also allows the focusing of the microwave power to heat the local area of the film.

Figure 5A:
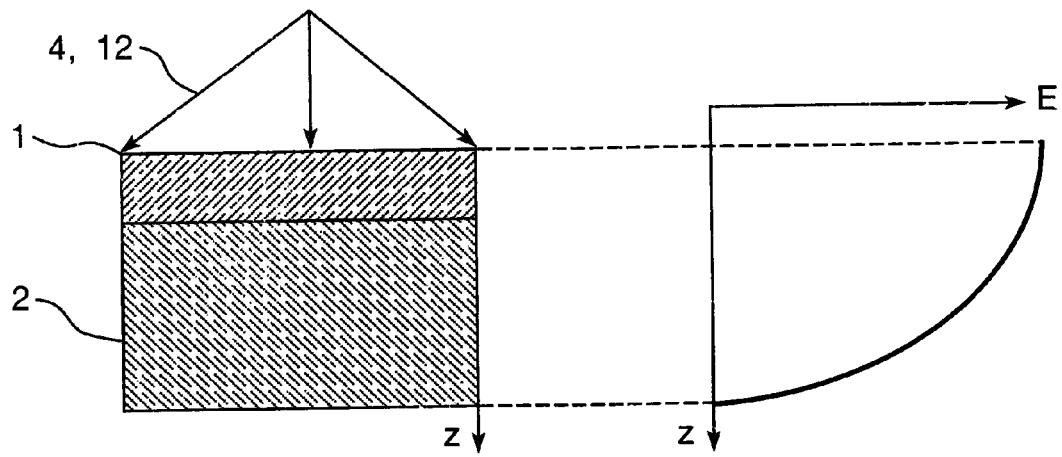
FIGS. 5a and 5b are schematic drawings and corresponding graphs illustrating the microwave power distributions respectively inside of the first glass sheet and film combinations of FIGS. 1 and 2 and inside of the laminate package of FIG. 4.
Figure 5B:
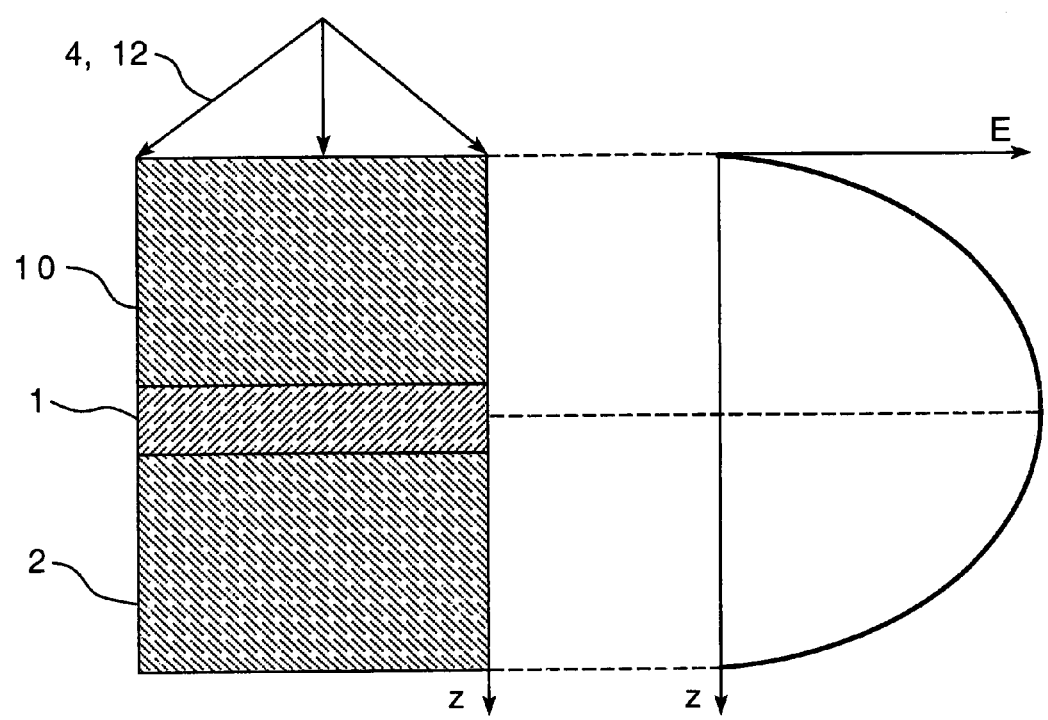

Efficiency and speed of the film heating and reheating increases if microwave radiation wavelength is selected to be about four optical thicknesses of the first glass sheet for the selected wavelength. In this case a standing wave distribution of microwave power is formed (see, for example, *Principles of Optics: Electromagnetic Theory Of Propagation, Interference And Diffraction Of Light* by Max Born and Emil Wolf; with contributions by A. B. Bhatia [et al.]. 7th expanded ed. New York: Cambridge University Press, 1999.). FIG. 5a illustrates energy distribution E in a glass sheet along the depth z during the heating of film (1) and in FIG. 5b the same distribution illustrated for the reheating process. These wavelengths are most preferred for heating and reheating film because they provide the most effective way to heat film (the required power level drops by several times); i.e., a comparatively short heating time can be achieved using a reasonable microwave power.

The standing wave type of microwave power distribution is a result of interference between the transmitted microwaves and those reflected from the opposing external surface of the glass sheet. In one embodiment of the invention, a reflector is placed behind the first glass sheet at a distance equal to 0, 1, 2, 3 . . . multiplied by half wavelengths in a vacuum corresponding to the selected frequency. The reflector intensifies this interference. A special metal plate, fixture or a portion thereof, and the like used for supporting the first glass sheet can be used as a reflector.

Efficiency and speed of the film heating is further increased if microwave radiation wavelength is selected to be about the sum of the skin layers in the film and the first glass sheet. In this case only the film and contiguous (bordering) layer of the first glass sheet are heated but not the entire glass in depth.

The present invention includes laminating more than two glass sheets as well. In this case the first, second, third and so forth glass sheets, except the last one, are covered separately by the film with a gap and each film is fixed to one edge of the correspondent glass sheet. Then each film is separately exposed to microwave radiation to heat selected film areas to sufficient bonding temperature, successively in a continuous manner, by non-stick pressing of the heated area of each film to the glass by a moving pressing zone, followed by cooling the pressed film areas of each film. As a result air removal from each selected area, as well as, appropriate bonding between the entire film and the surface of the corresponding glass are obtained. The microwave frequency range for the present invention is generally between about 0.9 GHz and about 200 GHz.

Figure 2:
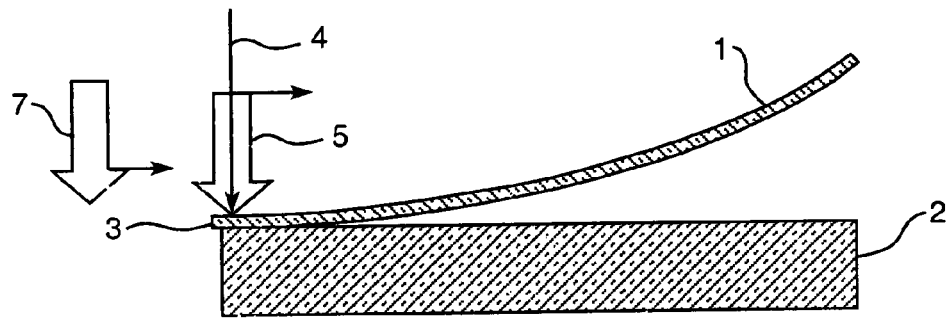
FIG. 2 is a schematic drawing illustrating progressive and simultaneous heating and pressing and subsequent cooling of the film by microwave through a roller in a continuous manner in accordance with the teachings of the present invention.
Figure 3:
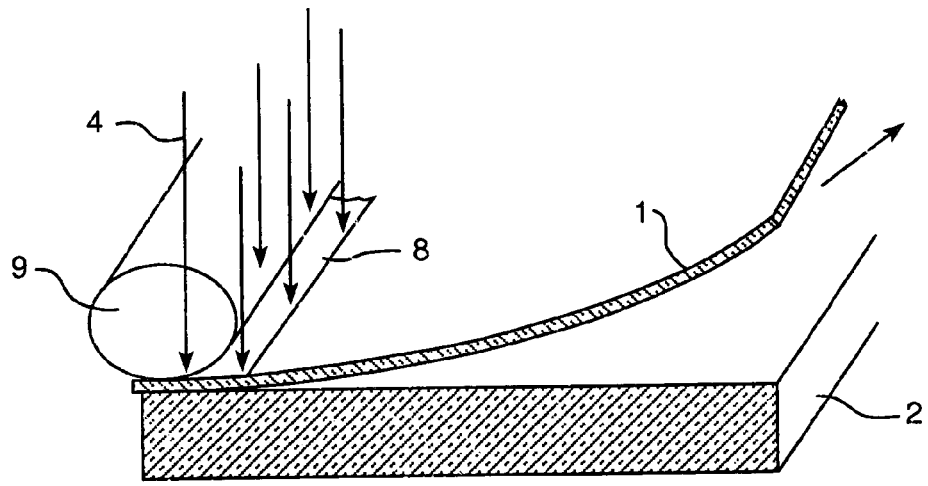
FIG. 3 is a schematic drawing illustrating progressive and simultaneous heating and pressing and subsequent cooling of the film wherein the microwave heating is provided through a roller with a heat distribution area in the shape of a strip in accordance with the teachings of the present invention.

Speed and quality of bonding also increases in this embodiment if heating and pressing of each film is provided simultaneously. Accordingly, the microwave radiation heats selected film areas of the film through the pressing tool (as is shown in FIG. 2) which is made from materials that are transparent to the microwaves. Among such materials are Teflon, quartz, oxide ceramic, or the like. The easiest way of simultaneously heating and pressing each film is to provide the local heat area in the shape of a strip (as is shown in FIG. 3) and to accomplish pressing by a roller made from Teflon, quartz, oxide ceramic, or the like.

Efficiency and speed of the film heating also increases in this embodiment if microwave radiation wavelength is selected to be preferably about four optical thicknesses of the correspondent glass sheet for the selected wavelength. In this case, a standing wave distribution of microwave power is formed to the maximum on the film (as shown in FIG. 5). These wavelengths are most preferred for heating films because they provide the most effective way to heat them.

When the films are bonded to the first, second, third and subsequent glass sheets, they are stacked together and placed in a sufficient bonding vacuum. The first glass sheets with bonded film are successively placed on top a preceding glass sheet with the bonded film thereof facing toward the next glass sheet of the stack. The second glass sheet is then placed on the top of the film with the non-coated surface of the second glass sheet contacting the film to create a package or stack with a selected number of glass sheets and interposed films. The package is pressed and reheated in the partial vacuum by microwave to sufficient bonding temperature and re-cooled to create the laminate. The laminating process is rapid because the vacuum level is selected so that remaining air does not create visible defects in the laminate. Practically, the vacuum level should be one kPa at the most and the frequency range should be between about 0.9 GHz and about 200 GHz. The preferable microwave radiation frequency is selected whereby the temperature variation of the stacked films does not exceed the permitted level.

In the embodiments of the invention discussed above, reheating time as well as cost can be reduced by at least 10% to 20% by using microwave radiation and an additional electromagnetic heat source with a wavelength that is significantly shorter than that of the applied microwave, for example infrared.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

We claim:

1. A method for laminating glass sheets, comprising:
   placing laminating film over one surface of a first glass sheet;
   heating said film with microwave radiation to a bonding temperature;
   successively pressing areas of the heated film to said one surface in a continuous manner for purging air from between said film and said one surface and for applying bonding pressure;
   cooling the pressed film areas whereby an appropriate bond is attained between said film and said one surface;
   subjecting said first glass sheet with bonded film to a partial vacuum and positioning a second glass sheet on said film and pressing said second glass sheet to said film;
   reheating said film with microwave radiation to a bonding temperature; and
   cooling said reheated film whereby an appropriate bond is attained between said film and said second glass sheet.

2. The method of claim 1 wherein the step of placing laminating film over one surface of a first glass sheet includes fixing an edge of said film to a corresponding edge of said first glass sheet, and the step of heating said film is initiated at said fixed edge and continuously advanced therefrom over said film.

3. The method of claim 1 wherein said film is placed over said one surface with a gap therebetween prior to successively pressing.

4. The method of claim 1 wherein the step of successively pressing is carried out with a non-stick applicator.

5. The method of claim 1 wherein the microwave radiation frequency is selected to be generally between approximately 0.9 GHz to approximately 200 GHz.

6. The method of claim 1 wherein a preferable microwave radiation wavelength is selected to be between approximately four optical thicknesses of said first glass sheet for the selected wavelength to approximately the sum of the thickness of skin layers in said film and said first glass sheet.

7. The method of claim 1 wherein heating of said film is provided by moving a heat source over the film.

8. The method of claim 1 wherein the vacuum level is selected whereby remaining air in the laminate does not create visible defects.

9. The method of claim 1 wherein an additional electromagnetic heat source with a wavelength that is significantly shorter than the applied microwave radiation is used to reheat the film.

10. The method of claim 9 wherein said additional electromagnetic heat source is selected from the group consisting of infrared, ultraviolet, laser and X-ray heat sources.

11. The method of claim 1 wherein the vacuum level is selected to be no greater than one kPa.

12. The method of claim 1 wherein said areas of heated film are strips and successively pressing is accomplished with a roller.

13. The method of claim 1 wherein the step of heating is carried out in a partial vacuum.

14. The method of claim 13 wherein the vacuum level is selected whereby remaining air in the laminate does not create visible defects.

15. The method of claim 1 wherein a reflector is positioned behind said first glass sheet at a distance equal to 0, 1, 2, 3 . . . multiplied by half wavelengths of the microwave radiation in a vacuum corresponding to the selected frequency.

16. The method of claim 15 wherein said reflector is at least in part supporting said first glass sheet.

17. The method of claim 1 wherein at least one combination of steps, selected from the combinations consisting of the steps of heating and successively pressing and the steps of reheating and pressing said second glass sheet, is performed simultaneously with an applicator tool comprised of materials transparent to microwave.

18. The method of claim 17 wherein the applicator tool material is selected from a group consisting of Teflon, quartz and oxide ceramic.

19. The method of claim 1, after subjecting said first glass sheet with bonded film to a partial vacuum, stacking multiple of said first glass sheets with bonded film in the partial vacuum to provide a stack whereby non-coated surfaces of said first glass sheets engage the film bonded to an adjacent first glass sheet with one bonded film left exposed, the steps of positioning and pressing said second glass sheet being carried out on the exposed film of said stack, and the steps of reheating and cooling each being carried out on all film layers in said stack simultaneously.

20. The method of claim 19 wherein reheating is carried out on said bonded films of said first sheets prior to stacking.

21. The method of claim 19 wherein the microwave radiation frequency is selected such that the temperature variation of the stacked films does not exceed a predetermined level.

* * * * *